US012620539B2

(12) United States Patent
Minowa et al.

(10) Patent No.: US 12,620,539 B2
(45) Date of Patent: May 5, 2026

(54) ELECTROMAGNETIC RELAY AND METHOD OF MANUFACTURING THE SAME

(71) Applicant: OMRON Corporation, Kyoto (JP)

(72) Inventors: Ryota Minowa, Kyoto (JP); Shinichi Ogawa, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 307 days.

(21) Appl. No.: 18/547,697

(22) PCT Filed: Jan. 18, 2022

(86) PCT No.: PCT/JP2022/001514

§ 371 (c)(1),
(2) Date: Aug. 24, 2023

(87) PCT Pub. No.: WO2022/185752

PCT Pub. Date: Sep. 9, 2022

(65) Prior Publication Data

US 2024/0145198 A1 May 2, 2024

(30) Foreign Application Priority Data

Mar. 5, 2021 (JP) ................................ 2021-035749

(51) Int. Cl.
*H01H 50/54* (2006.01)
*H01H 49/00* (2006.01)
(Continued)

(52) U.S. Cl.
CPC .......... *H01H 50/546* (2013.01); *H01H 49/00* (2013.01); *H01H 50/36* (2013.01); *H01H 50/44* (2013.01)

(58) Field of Classification Search
None
See application file for complete search history.

(56) References Cited

U.S. PATENT DOCUMENTS 8,138,872 B2 * 3/2012 Yoshihara .............. H01H 50/36 335/185
2009/0322454 A1 * 12/2009 Tanaka .................. H01H 50/38 335/189
(Continued)

FOREIGN PATENT DOCUMENTS

DE 102013210193 B4 * 2/2019 ............ H01H 47/00
JP 2015176728 A * 10/2015 ............ H01H 50/54
(Continued)

OTHER PUBLICATIONS

Machine translation of Tajima [JP 2015176728 A] (Year: 2015).*
(Continued)

*Primary Examiner* — Bernard Rojas
(74) *Attorney, Agent, or Firm* — SHINJYU GLOBAL IP

(57) ABSTRACT

An electromagnetic relay includes a contact device; a driving device including a coil, a spool, and first and second yokes; and a coil terminal. The second yoke, which is attached to the first yoke, includes a first side portion, a second side portion, a center portion extending therebetween, and a notch. The center portion of the second yoke is disposed between the contact device and the spool. The notch is located in the first side portion of the second yoke, at a position closer to the contact device than to the portion of the first side portion in contact with the first yoke. The coil terminal extends out of the electromagnetic relay via the notch.

9 Claims, 8 Drawing Sheets

(51) Int. Cl.
*H01H 50/36* (2006.01)
*H01H 50/44* (2006.01)

(56) References Cited

U.S. PATENT DOCUMENTS

| | | | | |
|---|---|---|---|---|
| 2016/0071675 | A1 | 3/2016 | Haehnel et al. | |
| 2016/0093457 | A1 | 3/2016 | Jang | |
| 2019/0148095 | A1* | 5/2019 | Minowa | H01H 50/14 335/185 |
| 2021/0083404 | A1* | 3/2021 | Harimochi | H01H 50/12 |
| 2025/0095939 | A1* | 3/2025 | Zhong | H01H 1/54 |

FOREIGN PATENT DOCUMENTS

| | | | |
|---|---|---|---|
| JP | 2016-521911 | A | 7/2016 |
| JP | 2020-87567 | A | 6/2020 |

OTHER PUBLICATIONS

International Search Report of International Application No. PCT/ JP2022/001514 issued on Apr. 5, 2022.
Written Opinion of the International Searching Authority of International Application No. PCT/ JP2022/001514 issued on Apr. 5, 2022.

* cited by examiner

ELECTROMAGNETIC RELAY AND METHOD OF MANUFACTURING THE SAME

CROSS-REFERENCE TO RELATED APPLICATION

This application is the U.S. National Phase of International Application No. PCT/JP2022/001514, filed on Jan. 18, 2022. This application claims priority to Japanese Patent Application No. 2021-035749, filed Mar. 5, 2021. The contents of those applications are incorporated by reference herein in their entireties.

FIELD

The claimed invention relates to electromagnetic relays and a method for use in manufacturing electromagnetic relays.

BACKGROUND

Japanese Patent Application Publication No. 2015-176728 discloses an electromagnetic relay that includes a contact device and a driving device configured to drive the contact device by electromagnetic force. The contact device includes a movable contact piece. The driving device includes a coil, a spool around which the coil is wound, a first yoke disposed between the contact device and the spool, and a U-shaped second yoke connected to the first yoke. The first yoke and the second yoke are arranged around the coil.

The second yoke includes a pair of side portions constructed and arranged to be in contact with the first yoke. The pair of side portions include an opening through which a terminal of the coil is pulled out, and are opposite to each other in the longitudinal direction of the movable contact piece. The opening is formed at a portion where the first yoke and the second yoke come in contact.

SUMMARY

In such a conventional electromagnetic relay, the opening for pulling out the coil terminal is formed at a portion where the first yoke and the second yoke come in contact. Thus, the contact area between the first yoke and the second yoke is small, and thereby the magnetic efficiency of the electromagnet decreases.

The claimed invention aims to provide an electromagnetic relay in which the magnetic efficiency of electromagnet is less likely to decrease.

Solution to Problems

An electromagnetic relay according to one aspect of the claimed invention includes a contact device, a driving device, and a coil terminal. The contact device includes a movable contact piece. The driving device includes a coil, a spool, a first yoke and a second yoke. The coil is arranged in a first direction with respect to the contact device. The spool extends in the axial direction along the first direction and the coil is wound around the spool. The first yoke is arranged in the first direction with respect to the coil. The second yoke is arranged around the coil and connected to the first yoke. The second yoke includes a first side portion, a second side portion, a center portion, and a notch through which the coil terminal extends. The first side portion extends in the axial direction and is in contact with the first yoke. The second side portion is arranged opposite the first side portion and is configured to be in contact with the first yoke. The center portion is disposed between the contact device and the spool. The center portion connects the first side portion and the second side portion. The notch is located in the first side portion at a position closer to the contact device than to the portion in contact with the first yoke.

In this electromagnetic relay, the notch for pulling out the coil terminal is located in the first side portion at a position closer to the contact device than to the portion in contact with the first yoke. As such, the contact area between the first yoke and the second yoke can be increased than in conventional relays, and thereby the magnetic efficiency of the electromagnet becomes less likely to decrease. In addition, the coil terminal is pulled out from a position closer to the contact device than to the first yoke, and thereby the coil terminal can be connected to an external terminal that is connected to the coil terminal more easily than before.

The first side portion may include a wide portion to be in contact with the first yoke, and a narrow portion having a dimension, in the lateral direction of the movable contact piece, smaller than that of the wide portion in the lateral direction of the movable contact piece. The notch may be formed in the narrow portion. In this case, the narrow portion secures space for a jig that is used to caulk the first yoke to the second yoke. Also, since the notch is located in the narrow portion, the notch can be downsized. That is, while securing space for a jig, effectively the magnetic efficiency of electromagnet becomes unlikely to decrease.

The spool may include a first flange portion positioned between the center portion of the second yoke and the coil, a second flange portion positioned between the coil and the first yoke, a trunk portion between the first flange portion and the second flange portion, and a terminal holding portion positioned on the first flange portion and configured to hold the coil terminal. In this case, the coil terminal can be held by the spool. In addition, since the coil terminal is placed at a position close to the contact device, the connection between the coil terminal and an external terminal to be connected to the coil terminal is further facilitated.

The first flange portion may include a peripheral edge portion and a relief portion on the peripheral edge portion to avoid interference with a boundary between the center portion and the first side portion and with a boundary between the center portion and the second side portion. The first flange portion may have a thickness, in the axial direction, greater than the second flange portion. In this case, the terminal holding portion can be easily formed, and the longitudinal dimension of the second yoke or the axial dimension of the second yoke of the movable contact piece can be reduced.

The first side portion may be disposed opposite to the second side portion in the longitudinal direction of the movable contact piece. In this case, the thickness of the electromagnetic relay can be reduced in the lateral direction of the movable contact piece.

The electromagnetic relay may further include a connector housing. The connector housing may include an opening through which a connector is inserted to be connected to the coil terminal. The opening may be open in a direction from the second side portion of the second yoke toward the first side portion of the second yoke. In this case, for example, rainwater is less likely to enter the connector housing in the axial direction.

The driving device may further include a fixed iron core fixed to the center portion of the second yoke. The spool may further include a cylindrical receiving portion extending in the axial direction and configured to receive the fixed iron core. The notch may extend to one end of the first side portion in the lateral direction of the movable contact piece. In this case, after the spool is incorporated into the second yoke, the coil terminal can be arranged in the notch by rotating the spool with respect to the second yoke.

The spool may be positioned relative to the first yoke by rotating relative to the second yoke at a position between the first side portion and the second side portion. With this simple configuration, the spool can be positioned with respect to the yoke.

A method for manufacturing an electromagnetic relay according to a second aspect includes preparing a spool assembly and a second yoke. The spool assembly includes a coil, a spool around which the coil is wound, and a coil terminal held by the spool. The second yoke includes a first side portion, a second side portion opposite to the first side portion, a center portion between the first side portion and the second side portion, and a notch located, in the first side portion, near the boundary with the center portion. The method further includes placing the spool assembly between the first side portion and the second side portion from an axial direction of the spool extending in the direction orthogonal to the center portion. The method further includes rotating the spool assembly around the axis of the spool to place the coil terminal in the notch after placing the spool assembly between the first side portion and the second side portion.

In the method of manufacturing an electromagnetic relay according to the second aspect, the notch for pulling out the coil terminal is formed near the boundary with the center portion in the first side portion. With this configuration, for example, when the electromagnetic relay includes the first yoke arranged in contact with the second yoke, the first yoke and the first yoke contact each other at a large area, and thereby the magnetic efficiency of electromagnet is less likely to decrease. Also, the connection between the coil terminal and an external terminal to be connected to the coil terminal is facilitated.

DETAILED DESCRIPTION

Figure 1:
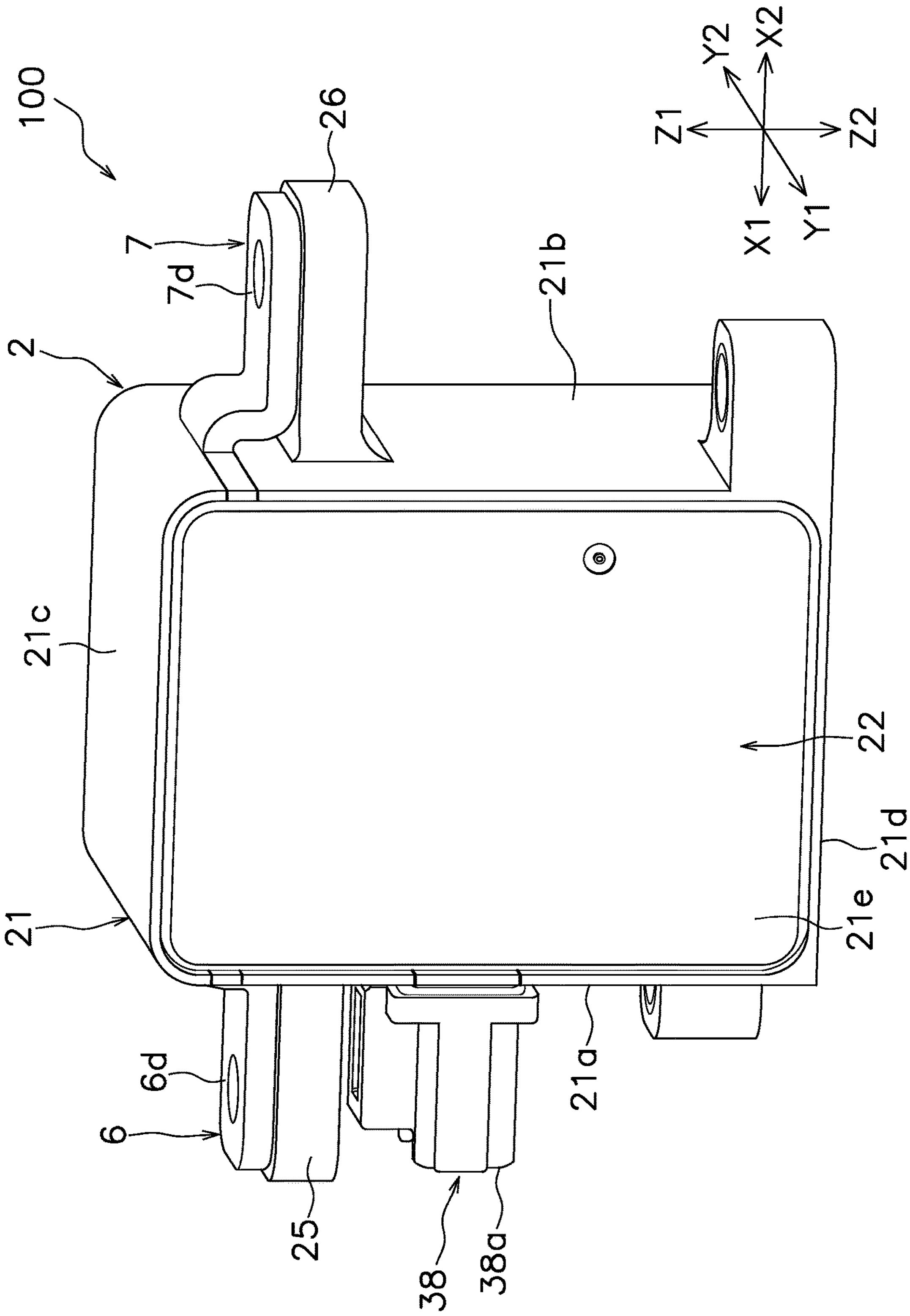
FIG. 1 is a perspective view of an electromagnetic relay.

An embodiment of an electromagnetic relay 100 according to one aspect of the claimed invention will be described below with reference to the drawings. When referring to the drawings, the X1 direction is the leftward direction, the X2 direction is the rightward direction, the Y1 direction is the forward direction, the Y2 direction is the rearward direction, the Z1 direction is the upward direction, and the Z2 direction is the downward direction. These directions are defined for convenience of explanation and do not limit the directions in which the electromagnetic relay 100 is arranged. Note that in the present embodiment, the Z2 direction is an example of a first direction.

As shown in FIGS. 1 to 4, the electromagnetic relay 100 includes a case 2, a contact device 3, a driving device 4, and a coil terminal 5.

The case 2 is a generally rectangular box in shape and is comprised of insulating material such as resin. In the present embodiment, the case 2 is comprised of resin. As shown in FIG. 1, the case 2 may have a dimension in the front-rear direction smaller than that in the left-right direction.

The case 2 includes a left wall 21*a*, a right wall 21*b*, an upper wall 21*c*, a lower wall 21*d*, a front wall 21*e*, and a rear wall (not visible). The left wall 21*a*, the right wall 21*b*, the upper wall 21*c*, the lower wall 21*d*, the front wall 21*e*, and the rear wall are outer walls of the case 2. The left wall 21*a* and the right wall 21*b* extend in the front-rear direction and the up-down direction. The left wall 21*a* faces the right wall 21*b* in the left-right direction. The upper wall 21*c* and the lower wall 21*d* extend in the front-rear direction and the left-right direction. The upper wall 21*c* faces the lower wall 21*d* in the up-down direction. The front wall 21*e* and the rear wall extend in the left-right direction and the up-down direction. The front wall 21*e* faces the rear wall in the front-rear direction.

The case 2 includes a case body 21, a lid portion 22, inner support portions 23 and 24, and outer support portions 25 and 26.

The case body 21 is open at the front. The case body 21 includes a left wall 21*a*, a right wall 21*b*, an upper wall 21*c*, a lower wall 21*d*, and a rear wall. The lid portion 22 includes a front wall 21*e*. The lid portion 22 is attached to the case body 21 so as to close the opening of the case body 21.

The inner support portion 23 protrudes rightward from an inner surface of the left wall 21*a*. The inner support portion 24 protrudes leftward from an inner surface of the right wall 21*b*. The inner support portions 23, 24 each have an upper flat surface.

The outer support portion 25 is arranged outside the case body 21. The outer support portion 25 protrudes leftward from an outer surface of the left wall 21*a*. The outer support portion 25 is disposed below the inner support portion 23. The outer support portion 26 protrudes rightward from an outer surface of the right wall 21*b*. The outer support portion 26 is disposed below the inner support portion 24. The outer support portions 25 and 26 each have an upper flat surface.

The contact device 3 includes a first fixed terminal 6, a second fixed terminal 7, and a movable contact piece S. The first fixed terminal 6 and the second fixed terminal 7 are plate terminals, and are comprised of material having conductivity. The first fixed terminal 6 and the second fixed terminal 7 extend in the left-right direction and have a bent shape. The first fixed terminal 6 and the second fixed terminal 7 extend across the inside and outside of the case 2.

The first fixed terminal 6 includes a first fixed contact 6*a*, a contact support portion 6*b*, an extension portion 6*c*, and an external connection portion 6*d*. The first fixed contact 6*a* is arranged inside the case 2. The contact support portion 6*b* supports the first fixed contact 6*a*. The extension portion 6*c* extends leftward from the contact support portion 6*b*. The extension portion 6*c* is supported on the upper surface of the inner support portion 23. The external connection portion 6*d* is arranged on the left side of the case body 21 so as to be exposed to the outside. The external connection portion 6*d* extends in the left-right direction and is supported on the upper surface of the outer support portion 25. The external connection portion 6*d* is to be connected to an external terminal (not shown) such as a bus bar.

The second fixed terminal 7 is arranged apart from the first fixed terminal 6 in the left-right direction. The second fixed terminal 7 includes a second fixed contact 7*a*, a contact support portion 7*b*, an extension portion 7*c*, and an external connection portion 7*d*. Since the second fixed terminal 7 is symmetric to the first fixed terminal 6, detailed description thereof will be omitted.

The movable contact piece 8 is a plate terminal elongated in one direction and comprised of conductive material. The movable contact piece 8 is positioned inside the case 2. The movable contact piece 8 extends in the left-right direction inside the case 2. The movable contact piece 8 is arranged in the up-down direction relative to and facing the first fixed contact 6*a* and the second fixed contact 7*a*. The movable contact piece 8 is movable in the up-down direction. The movable contact piece 8 has a dimension in the left-right direction larger than that in the front-rear direction. A longitudinal direction of the movable contact piece 8 coincides with the left-right direction. A lateral direction of the movable contact piece 8 coincides with the front-rear direction.

The movable contact piece 8 includes a first movable contact 8*a* and a second movable contact 8*b*. The first movable contact 8*a* is disposed to face the first fixed contact 6*a*. The second movable contact 8*b* is disposed to face the second fixed contact 7*a*.

The driving device 4 is housed in the case 2. The driving device 4 is configured to move the movable contact piece 8 in the up-down direction. The driving device 4 includes a movable mechanism 11, a coil 12, a spool 13, a movable iron core 14, a fixed iron core 15, a first yoke 16, a second yoke 17, and a return spring 18.

Figure 2:
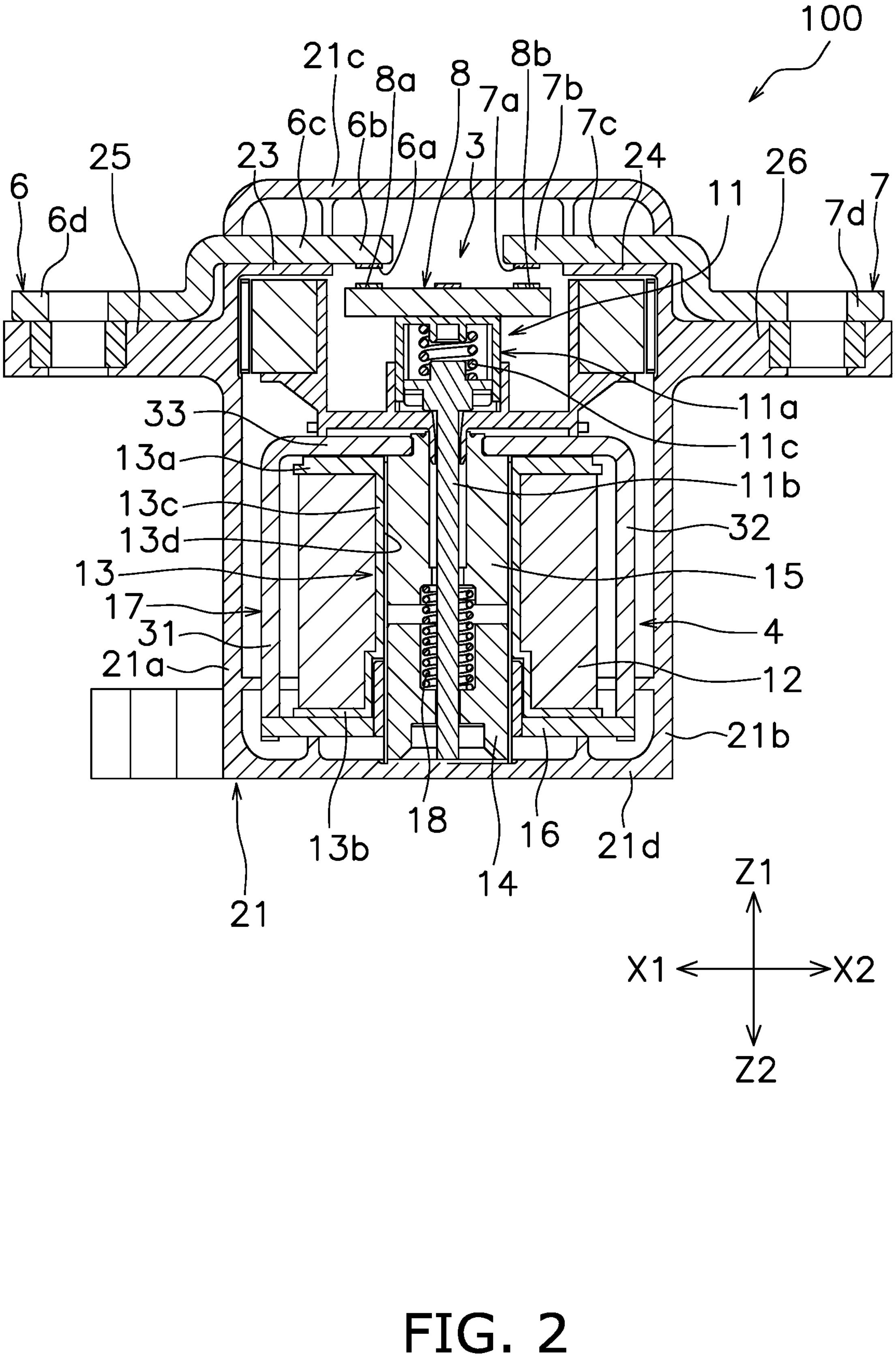
FIG. 2 is a cross-sectional view of the electromagnetic relay.

The movable mechanism 11 is connected to the movable contact piece 8. As shown in FIG. 2, the movable mechanism 11 includes a holder 11*a*, a drive shaft 11*b*, and a contact spring 11*c*. The holder 11*a* holds the movable contact piece S. The holder 11*a* is movable integrally with the movable contact piece 8. The drive shaft 11*b* extends in the up-down direction. The drive shaft 11*b* is disposed below the movable contact piece 8. The drive shaft 11*b* is connected to the holder 11*a* so as to be movable relative to the holder 11*a* in the up-down direction. The contact spring 11*c* is arranged between the holder 11*a* and the drive shaft 11*b*. The contact spring 11*c* urges the movable contact piece 8 upward via the holder 11*a*.

When a voltage is applied to excite the coil 12, the coil 12 generates an electromagnetic force that causes the movable iron core 14 to move upward. The coil 12 is disposed downward with respect to the contact device 3.

The coil 12 is wound around the spool 13. The spool 13 extends in the up-down direction. The axial direction of the spool 13 coincides with the up-down direction. The spool 13 includes a first flange portion 13*a*, a second flange portion 13*b*, a trunk portion 13*c*, a housing portion 13*d*, and a terminal holding portion 13*e*.

The outer diameter of the first flange portion 13*a* and the outer diameter of the second flange portion 13*b* are larger than the outer diameter of the trunk portion 13*c*. The first flange portion 13*a* and the second flange portion 13*b* are circular in shape when viewed from the up-down direction, except for the terminal holding portion 13*e*. The first flange portion 13*a* is connected to the upper end of the trunk portion 13*c*. The second flange portion 13*b* is connected to the lower end of the trunk portion 13*c*. The second flange portion 13*b* faces the first flange portion 13*a* in the up-down direction.

The trunk portion 13*c* has a cylindrical shape, and the coil 12 is wound around the circumference of the trunk portion 13*c*. The trunk portion 13*c* extends in the up-down direction. The trunk portion 13*c* is arranged between the first flange portion 13*a* and the second flange portion 13*b*.

The housing portion 13*d* is located in the trunk portion 13*c*. The housing portion 13*d* extends in the up-down direction. The housing portion 13*d* is a circular hole when viewed from the up-down direction. The housing portion 13*d* is formed in the up-down direction through the center portion of the trunk portion 13*c*.

Figure 3:
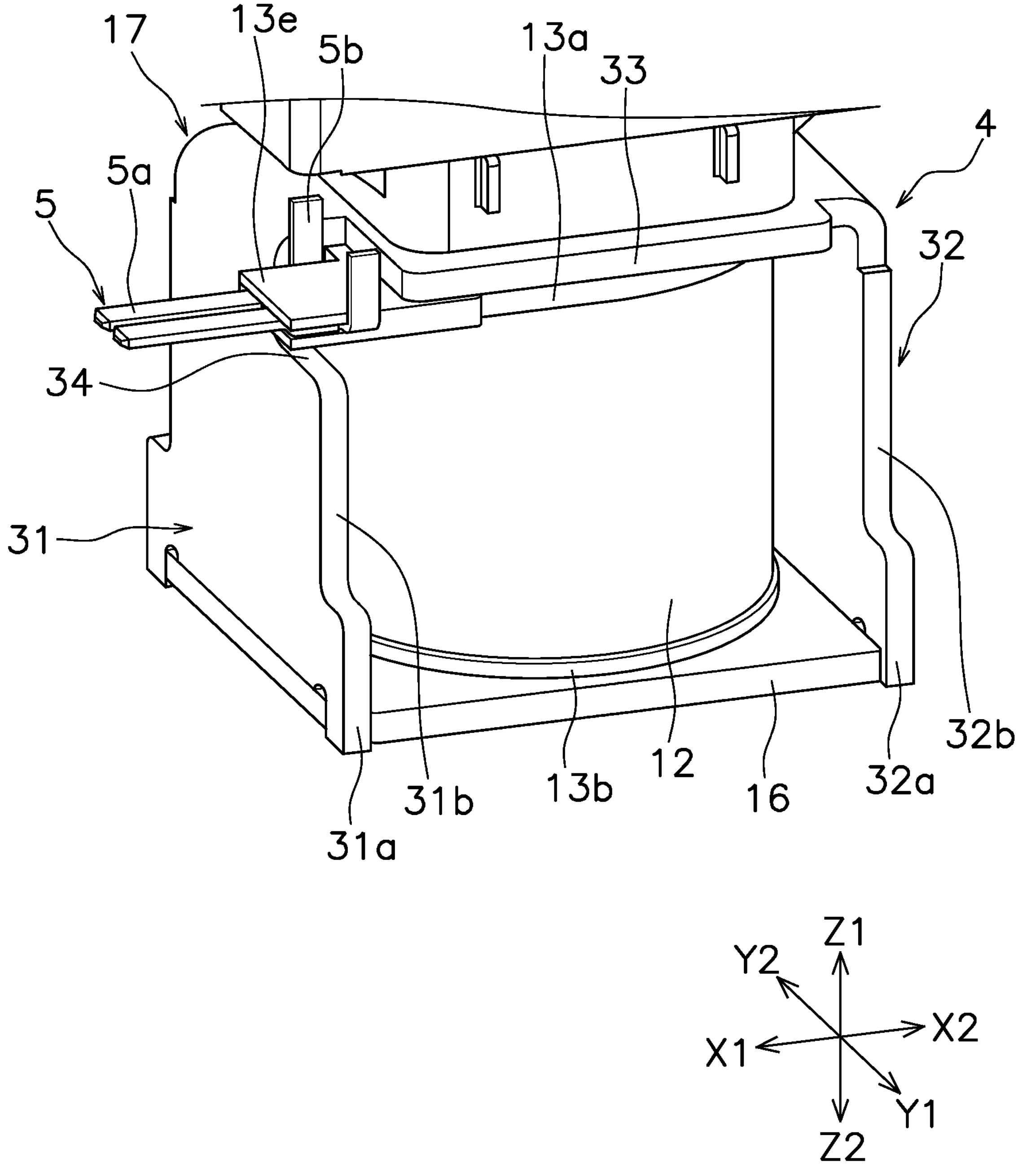
FIG. 3 is a perspective view of a driving device and the area around it.
Figure 4:
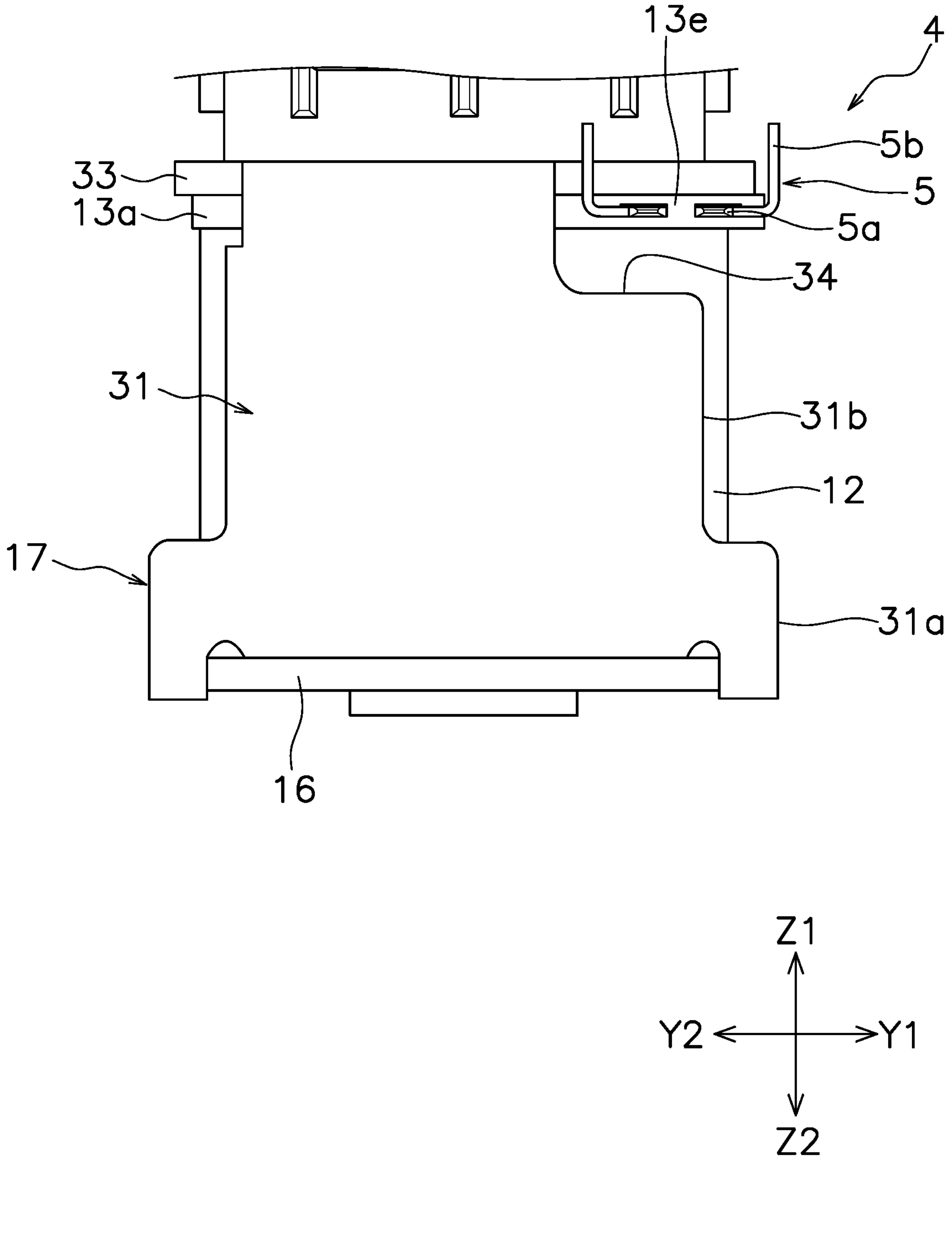
FIG. 4 is a side view of the driving device shown in FIG. 3.

As shown in FIGS. 3 and 4, the terminal holding portion 13*e* is formed on the first flange portion 13*a*. The terminal holding portion 13*e* extends leftward from the first flange portion 13*a*. The terminal holding portion 13*e* penetrates the left wall 21*a* of the case 2 in the left-right direction and is exposed to the outside from the left wall 21*a*.

The first yoke 16 is rectangular when viewed from the up-down direction, and extends in the left-right direction and the front-rear direction. The first yoke 16 is disposed downward with respect to the coil 12. The first yoke 16 is disposed below the second flange portion 13*b* and covers the coil 12 from below.

The second yoke 17 is arranged around the coil 12 and connected to the first yoke 16. The second yoke 17 has a U shape. The second yoke 17 is arranged to be in a U-shape when viewed from the front-rear direction. The second yoke 17 is arranged so as to surround the coil 12 from the left-right direction and from above.

The second yoke 17 includes a first side portion 31, a second side portion 32, a center portion 33 extending between the first and second side portions 31 and 32, and a notch 34. The first side portion 31 and the second side portion 32 are substantially rectangular and extend in the up-down direction and the front-rear direction. The first side portion 31 is positioned to the left of the coil 12. The first side portion 31 is, at its lower end, in contact with the first yoke 16.

The first side portion 31, as shown in FIGS. 3 and 4, includes a wide portion 31*a* and a narrow portion 31*b*. The wide portion 31*a* is located at the lower end of the first side portion 31. The wide portion 31*a* is, at its lower end, in contact with the first yoke 16. The dimension of the wide portion 31*a* in the front-rear direction is greater than the dimension of the coil 12 in the front-rear direction. The narrow portion 31*b* has a smaller dimension in the front-rear direction than the wide portion 31*a*. In the present embodiment, the dimension of the narrow portion 31*b* in the front-rear direction is smaller than the dimension of the coil 12 in the front-rear direction. The narrow portion 31*b* extends from the wide portion 31*a* to the center portion 33. The narrow portion 31*b* ensures space for a jig that caulks the first yoke 16 to the second yoke 17.

The second side portion 32 is located to the right of the coil 12. The second side portion 32 faces the first side portion 31 in the left-right direction. The lower end of the second side portion 32 is in contact with the first yoke 16. The second side portion 32 includes a wide portion 32*a* and a narrow portion 32*b*. Since the second side portion 32 is substantially symmetrical to the first side portion 31, detailed description thereof will be omitted.

The center portion 33 is arranged between the contact device 3 and the spool 13 in the up-down direction. The center portion 33 is arranged between the first side portion 31 and the second side portion 32 in the left-right direction, and connects the first side portion 31 and the second side portion 32. The boundary part between the center portion 33 and the first side portion 31 and the boundary part between the center portion 33 and the second side portion 32 are each formed in a curved or rounded shape. The center portion 33 faces the first yoke 16 in the up-down direction. The center portion 33 is arranged on top of the first flange portion 13*a* and covers the coil 12 from above.

The notch 34 is configured to allow the coil terminal 5 to be pulled out, i.e., to extend beyond the first side portion 31 of the second yoke 17. The notch 34 is formed, in the first side portion 31, at a position closer to the contact device 3 than to the portion of the second yoke 17 that is in contact with the first yoke 16. In the present embodiment, the notch 34 is formed near the boundary part between the first side portion 31 and the center portion 33. The notch 34 is made by cutting out part of the narrow portion 31*b* of the first side portion 31. The notch 34 extends to one end of the first side portion 31 in the front-rear direction. The notch 34 is formed so as to be cut out rearward from the front end of the narrow portion 31*b*. Thus, the notch 34 is open forward. Note that, in the present embodiment, the notch 34 is made by cutting out part of the center portion 33 as well.

The movable iron core 14 is fixed to the drive shaft 11*b* so as to be movable integrally therewith. The movable iron core 14 and the fixed iron core 15 are arranged in the housing portion 13*d* of the spool 13. The movable iron core 14 and the fixed iron core 15 have a shape corresponding to the shape of the housing portion 13*d*. With this configuration, in the present embodiment, the movable iron core 14 and the fixed iron core 15 are circular when viewed from the up-down direction. The fixed iron core 15 is caulked to the center portion 33 of the second yoke 17. The fixed iron core 15 is disposed above the movable iron core 14 to face the movable iron core 14. The return spring 18 urges the movable iron core 14 downward.

The coil terminal 5 functions to supply drive power to the coil 12 and is electrically connected to the coil 12. The coil terminal 5 is pulled out of the case 2 (i.e., extends outside of the case 2) through the notch 34. The coil terminal 5 is exposed outside the case 2 from the left wall 21*a* of the case 2. The coil terminal 5 passes through the notch 34 and the left wall 21*a* of the case 2 in the left-right direction. The coil terminal 5 is held by the terminal holding portion 13*e*. The terminal holding portion 13*e* passes through the first side portion 31 in the left-right direction via the notch 34.

As shown in FIGS. 3 and 4, the coil terminal 5 includes a pair of tab terminals 5*a* and a pair of coil connection portions 5*b* to be connected to the coil 12. The pair of tab terminals 5*a* extend in the left-right direction, and their tips are exposed outside the case 2. The pair of coil connection portions 5*b* are each a portion to which an end of the coil 12 is connected. The pair of coil connection portions 5*b* extend upward from the pair of tab terminals 5*a* at a position near the notch 34. The pair of coil connection portions 5*b* extends upward beyond the center portion 33.

The electromagnetic relay 100 includes a connector housing 38 as shown in FIG. 1. Into the connector housing 38, a connector (not shown) connected to the coil terminal 5 is inserted. The pair of tab terminals 5*a* are arranged inside the connector housing 38. The connector housing 38 is fixed to the left wall 21*a* of the case 2. The connector housing 38 extends leftward from the left wall 21*a* of the case 2. The connector housing 38 includes an opening 38*a* through which the connector is inserted. The opening 38*a* is open in the direction from the second side portion 32 of the second yoke 17 toward the first side portion 31 of the second yoke 17 (here, the leftward direction), and the connector is inserted through the opening 38*a* so that the connector is electrically connected to the coil terminal 5. In FIGS. 3 and 4, the connector housing 38 is not illustrated.

Figure 5:
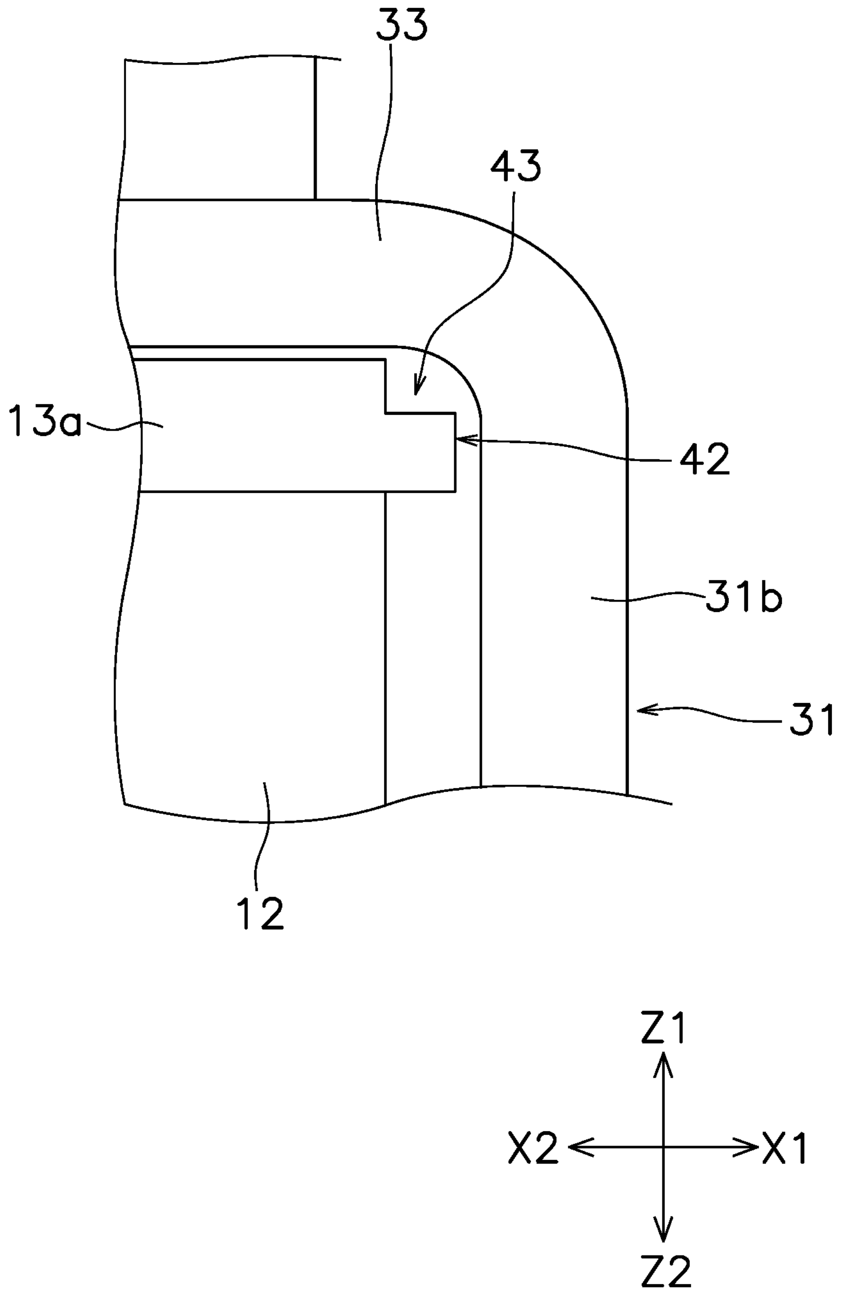
FIG. 5 is an enlarged view of an outer peripheral edge of a first flange portion and the area around it.

FIG. 5 is an enlarged view of the outer periphery of the first flange portion 13*a* of the spool 13 and the region around it. The first flange portion 13*a* includes peripheral edge portion 42 and a relief portion 43. The peripheral edge portion 42 is the outer peripheral edge of the first flange portion 13*a*. The relief portion 43 is formed to avoid interference with the boundary between the center portion 33 and the first side portion 31 and also with the boundary between the center portion 33 and the second side portion 32. The relief portion 43 is located at the upper end of the peripheral edge portion 42. The relief portion 43 extends along the periphery of the peripheral edge portion 42. The relief portion 43 is formed by cutting out an upper peripheral edge of the peripheral edge portion 42. Note that, in the present embodiment, the first flange portion 13*a* has a thickness in the up-down direction greater than that of the second flange portion 13*b*.

Figure 6:
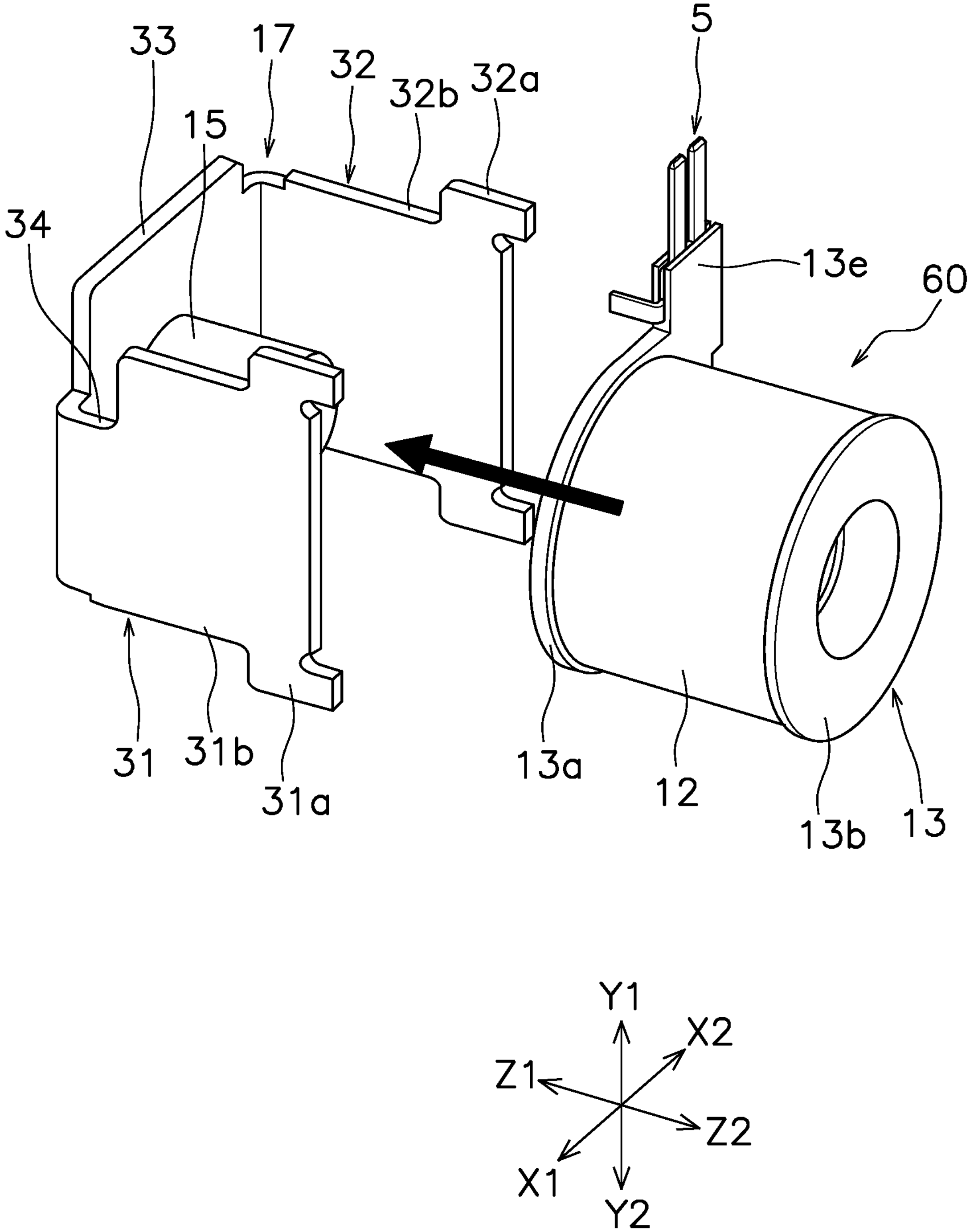
FIGS. 6-9 are sequential perspective views illustrating a method for use in manufacturing an electromagnetic relay.

Next, with reference to FIGS. 6 to 9, a process used in manufacturing the electromagnetic relay 100—specifically, the part of the process for manufacturing the driving device 4 of the electromagnetic relay 100—will be described. The process of manufacturing the driving device 4 includes a first step, a second step, a third step, and a fourth step. The first step includes preparing the second yoke 17 and the spool assembly 60, as shown in FIG. 6. The spool assembly 60 includes the coil 12, the spool 13, and the coil terminal 5. In the spool assembly 60, the coil 12 is wound around the spool 13, and the coil terminal 5 is held by the terminal holding portion 13*e*. The first step also includes fixing the fixed iron core 15 to the second yoke 17. The fixed iron core 15 is fixed to the second yoke 17, for example by caulking.

Figure 7:
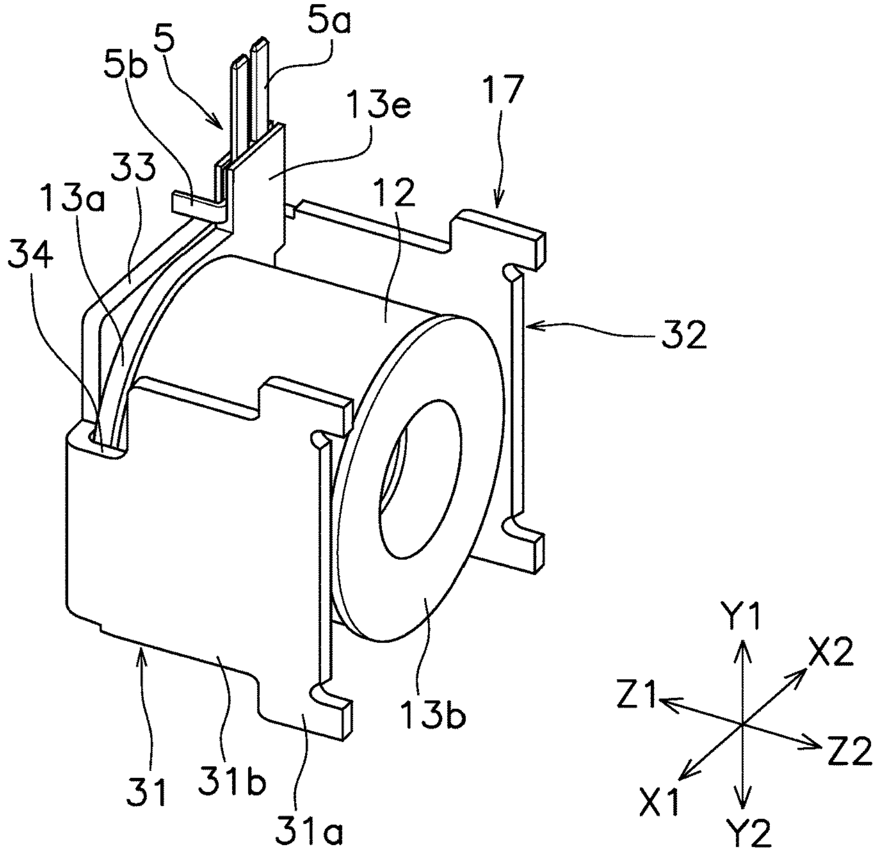

In the second step, as shown in FIGS. 6 and 7, the spool assembly 60 is moved in the axial direction and placed between the first side portion 31 and the second side portion 32, at a position where the coil terminal 5 does not overlap the first side portion 31 and the second side portion 32 in the axial direction. That is, the spool assembly 60 is incorporated into the second yoke 17 so that the housing portion 13*d* of the spool 13 is accommodated in the fixed iron core 15 at a position where the coil terminal 5 does not interfere with the second yoke 17 in the axial direction.

Figure 8:
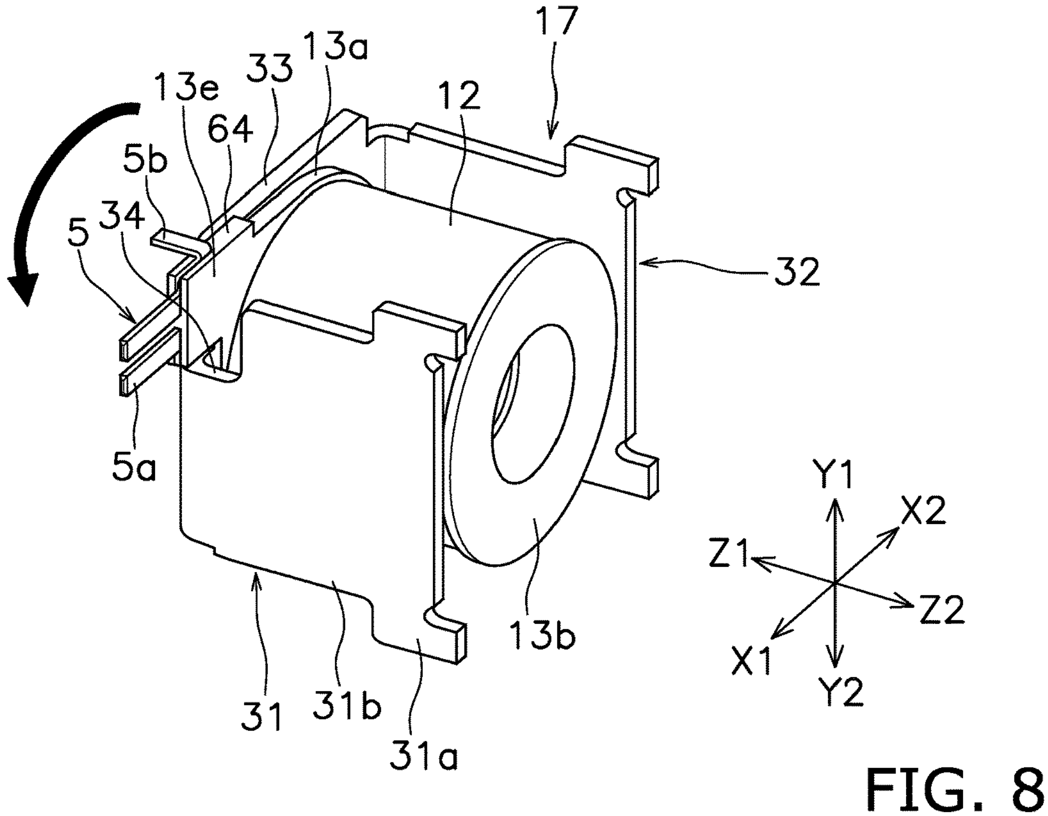

The third step includes rotating the spool assembly 60 around the axis of the spool 13 after the second step to place the coil terminal 5 on the notch 34, as shown in FIG. 8. In a state where the coil terminal 5 is arranged on the notch 34, the coil terminal 5 passes through the first side portion 31 through the notch 34 in the left-right direction. Also, the third step includes positioning the spool 13 with respect to the second yoke 17. The spool 13 is positioned with respect to second yoke 17 by a stopper 64 disposed between spool 13 and second yoke 17. In the present embodiment, the stopper 64 is formed on the terminal holding portion 13*e* of the spool 13.

Figure 9:
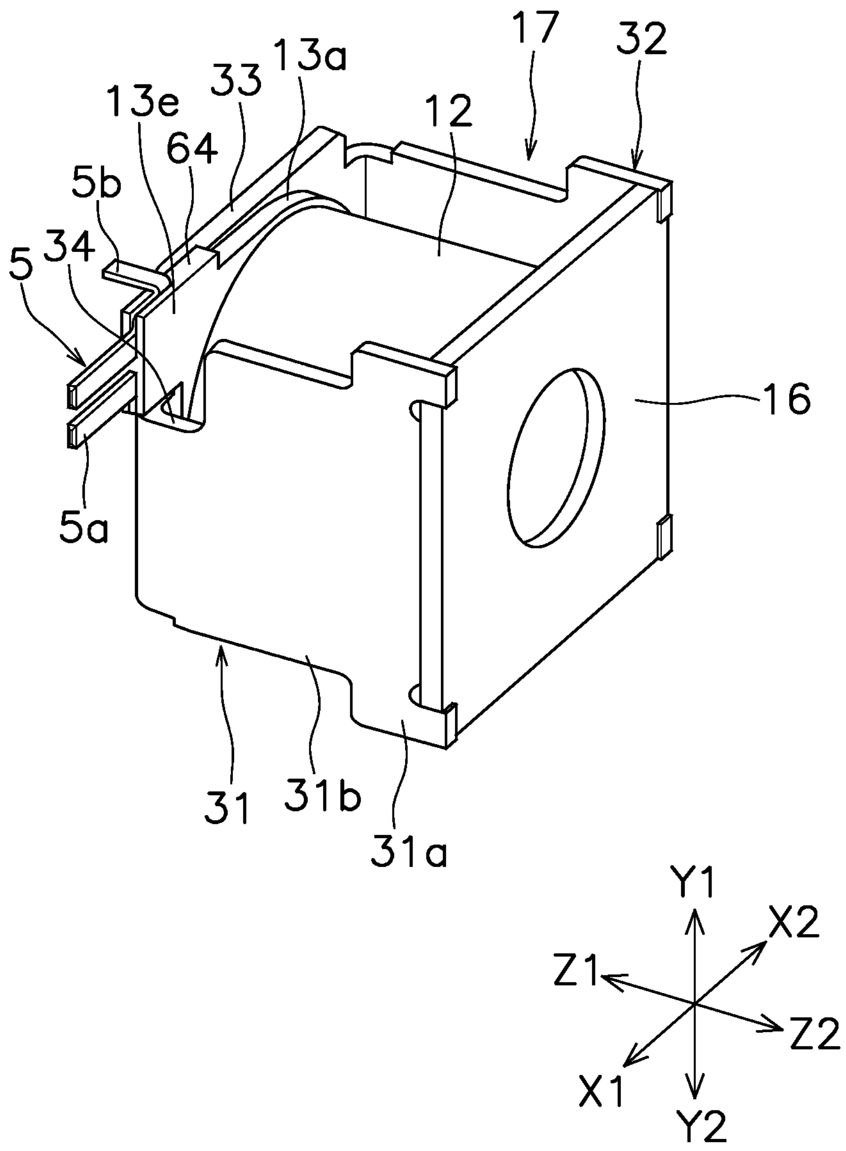

The fourth step includes, as shown in FIG. 9, a step of preparing the first yoke 16 and a step of fixing the first yoke 16 to the second yoke 17 after the third step. The first yoke 16 is caulked to the second yoke 17 by, for example, a jig (not shown).

In the electromagnetic relay 100 configured as described above, the notch 34 for pulling out the coil terminal 5 is located at a position in the first side portion 31 that is closer to the contact device 3 than to the portion of the first side portion 31 that contacts the first yoke 16. As a result, a larger contact area can be secured between the first yoke 16 and the second yoke 17 than in the conventional art, and thereby the magnetic efficiency of the electromagnet is less likely to be reduced. In addition, since the coil terminal 5 is pulled out from a position closer to the contact device 3 than to the first yoke 16, the connection between the coil terminal 5 and an external terminal to be connected to the coil terminal 5 is facilitated. Also, in the present embodiment, the notch 34 is located in the narrow portion 31*b*, which means that part of the narrow portion 31*b* serves as the notch 34. With this configuration, the notch 34 can be small in size. As such, the magnetic efficiency of the electromagnet can be prevented from decreasing while securing the space for a jig by the narrow portion 31*b*.

An embodiment of the electromagnetic relay according to one aspect of the claimed invention have been described above, but the claimed invention is not limited to the above embodiments, and various modifications are possible without departing from the gist of the invention.

In the above embodiment, the first side portion 31 and the second side portion 32 face each other in the left-right direction, but the second yoke 17 may be positioned so that the first side portion 31 and the second side portion 32 face each other in the front-rear direction.

REFERENCE NUMERALS

3 Contact device
4 Driving device
5 Coil terminal
8 Movable contact piece
12 Coil
13 Spool
13*a* First flange portion
13*b* Second flange portion
13*c* Trunk portion
13*d* Receiving portion
13*e* Terminal holding portion
15 Contact iron core
16 First yoke
17 Second yoke
31 First side portion
32 Second side portion
33 Center portion
31*a* Wide portion
31*b* Narrow portion
38 Connector housing
38*a* Opening
42 Peripheral edge portion
43 Relief portion
100 Electromagnetic relay

The invention claimed is:

1. An electromagnetic relay, comprising:

a contact device including a movable contact piece;

a driving device including a coil arranged in a first direction with respect to the contact device, a spool around which the coil is wound, a first yoke arranged in the first direction with respect to the coil, and a second yoke arranged around the coil, the spool extending in an axial direction along the first direction and the second yoke being connected to the first yoke, the second yoke being a separate body from the first yoke, the second yoke being a single unitary one-piece member; and a coil terminal connected to the coil, the second yoke including a first side portion extending in the axial direction and in contact with the first yoke; a second side portion arranged opposite the first side portion, extending in the axial direction, and in contact with the first yoke; a center portion disposed between the contact device and the spool; and a notch through which the coil terminal extends, the center portion connecting the first side portion and the second side portion, the notch being located in the first side portion at a position closer to the contact device than to a portion of the first side portion that is in contact with the first yoke, the first side portion including a wide portion in contact with the first yoke and a narrow portion having a dimension, in a lateral direction of the movable contact piece, smaller than a dimension of the wide portion in the lateral direction of the movable contact piece, and the notch being located in the narrow portion.

2. An electromagnetic relay, comprising:

a contact device including a movable contact piece;

a driving device including a coil arranged in a first direction with respect to the contact device, a spool around which the coil is wound, a first yoke arranged in the first direction with respect to the coil, and a second yoke arranged around the coil, the spool extending in an axial direction along the first direction and the second yoke being connected to the first yoke, the second yoke being a separate body from the first yoke, the second yoke being a single unitary one-piece member; and a coil terminal connected to the coil, the second yoke including a first side portion extending in the axial direction and in contact with the first yoke; a second side portion arranged opposite the first side portion, extending in the axial direction, and in contact with the first yoke; a center portion disposed between the contact device and the spool; and a notch through which the coil terminal extends, the center portion connecting the first side portion and the second side portion, the notch being located in the first side portion at a position closer to the contact device than to a portion of the first side portion that is in contact with the first yoke, the spool including a first flange portion disposed between the center portion of the second yoke and the coil, a second flange portion disposed between the coil and the first yoke, a trunk portion disposed between the first flange portion and the second flange portion, and a terminal holding portion disposed on the first flange portion, the terminal holding portion configured to hold the coil terminal.

3. The electromagnetic relay according to claim 2, wherein the first flange portion includes a peripheral edge portion and a relief portion located on the peripheral edge portion to avoid interference with a boundary between the center portion and the first side portion and with a boundary between the center portion and the second side portion, the first flange portion having a thickness, in the axial direction, greater than the second flange portion.

4. The electromagnetic relay according to claim 2, wherein the first side portion is opposite to the second side portion in a longitudinal direction of the movable contact piece.

5. The electromagnetic relay according to claim 2, further comprising a connector housing, the connector housing including an opening to which a connector connected to the coil terminal is inserted, the opening being opened in a direction from the second side portion of the second yoke toward the first side portion of the second yoke.

6. The electromagnetic relay according to claim 2, wherein the driving device further includes a fixed iron core fixed to the center portion of the second yoke, the spool further includes a receiving portion having a cylindrical shape, the receiving portion extending in the axial direction, the receiving portion configured to receive the fixed iron core, and the notch extends to one end of the first side portion in a lateral direction of the movable contact piece.

7. The electromagnetic relay according to claim 6, wherein the spool is positioned relative to the first yoke by rotating relative to the second yoke at a position between the first side portion and the second side portion.

8. The electromagnetic relay according to claim 2, wherein a boundary part between the center portion and the first side portion of the second yoke is rounded in an arc shape.

9. The electromagnetic relay according to claim 2, wherein the notch extends through the first side portion and opens toward an end of the first side portion in a front-rear direction orthogonal to the first direction.

* * * * *